(12) United States Patent
Takaishi et al.

(10) Patent No.: US 8,106,625 B2
(45) Date of Patent: Jan. 31, 2012

(54) NONCONTACT TRANSMISSION DEVICE

(75) Inventors: Konomu Takaishi, Osaka (JP);
Kazunori Nohara, Zama (JP)

(73) Assignees: Aska Electron Corporation, Osaka (JP); Sanyo Electric Co., Ltd., Osaka (JP); Sanyo Semiconductor Co., Ltd., Gunma (JP)

( * ) Notice: Subject to any disclaimer, the term of this patent is extended or adjusted under 35 U.S.C. 154(b) by 257 days.

(21) Appl. No.: 12/517,038

(22) PCT Filed: Nov. 29, 2007

(86) PCT No.: PCT/JP2007/073051
§ 371 (c)(1),
(2), (4) Date: May 29, 2009

(87) PCT Pub. No.: WO2008/066111
PCT Pub. Date: Jun. 5, 2008

(65) Prior Publication Data
US 2010/0052430 A1    Mar. 4, 2010

(30) Foreign Application Priority Data
Nov. 30, 2006    (JP) .................................. 2006-323348

(51) Int. Cl.
*H01M 10/46*    (2006.01)
(52) U.S. Cl. ........................................ 320/107; 320/108
(58) Field of Classification Search .................. 320/107, 320/108
See application file for complete search history.

(56) References Cited

U.S. PATENT DOCUMENTS
2006/0076934 A1    4/2006    Ogata et al.

FOREIGN PATENT DOCUMENTS

| JP | 57-32144 | 2/1982 |
| JP | 5-4736 | 1/1993 |
| JP | 2689927 B2 | 12/1997 |
| JP | 11-234919 | 8/1999 |
| JP | 2006-60909 | 3/2006 |
| JP | 2006-101609 | 4/2006 |
| JP | 2006-203032 A | 8/2006 |
| JP | 2006-230032 | 8/2006 |
| KR | 0387066 | 6/2003 |

OTHER PUBLICATIONS

Korean Office Action for Application No. 2009-7011033, mailed on Nov. 30, 2010 (7 pages).

(Continued)

*Primary Examiner* — Reena Aurora
(74) *Attorney, Agent, or Firm* — Osha Liang LLP

(57) ABSTRACT

A noncontact transmission device (100) is provided with a monitoring clock oscillator (112) for outputting a monitoring clock (LF0) having a frequency lower than that of a system clock (CK0); a control circuit (108); a memory (114) having information (D) stored to be used by the control circuit (108); and a reset circuit (116). The control circuit (108) includes an internal storage circuit for storing the information (D) read out from the memory (114). The control circuit (108) reads out and updates the information (D) stored in the internal storage circuit from the memory (114) with an update period based on the monitoring clock (LF0). Furthermore, the control circuit (108) is reset with a reset period longer than the update period based on the monitoring clock (LF0), and, each time the control circuit (108) is reset, reads out the information (D) from the memory (114) and updates the information (D) stored in the internal storage circuit.

2 Claims, 4 Drawing Sheets

OTHER PUBLICATIONS

Korean Patent Abstracts for Korean Publication No. 10-2002-0093467, publication date Dec. 16, 2002 (1 page).
Translation of Claim 1 for Japanese Publication No. 5-4736, publication date Jan. 22, 1993 (1 page).
Taiwanese Office Action for Application No. 096145528, mailed on Feb. 10, 2011 (6 pages).
Patent Abstracts of Japan for Japanese Publication No. 2006-203032, publication date Aug. 3, 2006 (1 page).
International Search Report for PCT/JP2007/073051 mailed Jan. 8, 2008 (3 pages).
Written Opinion for PCT/JP2007/073051 mailed Jan. 8, 2008 (3 pages).
esp@cenet patent abstract for JP2006230032 (A) dated Aug. 31, 2006 (1 page).
esp@cenet patent abstract for JP2006060909 (A) dated Mar. 2, 2006 (1 page).
esp@cenet patent abstract for JP2006101609 (A) dated Apr. 13, 2006 (1 page).
esp@cenet patent abstract for JP57032144 (A) dated Feb. 20, 1982 (1 page).
esp@cenet patent abstract for JP11234919 (A) dated Aug. 27, 1999 (1 page).
Notification Concerning Transmittal of International Preliminary Report on Patentability from PCT/JP2007/073051, dated Jun. 11, 2009 (10 pages).
Chinese Office Action for Application No. 200780043836.8, mailed on May 25, 2011 (5 pages).
Office Action for Chinese Patent Application No. 200780043836.8 dated Nov. 25, 2011, with English translation thereof (5 pages).

NONCONTACT TRANSMISSION DEVICE

TECHNICAL FIELD

The present invention relates to a noncontact transmission device which transmits at least one of electric power and a data signal to a device to which at least one of the electric power and the data signal is to be transmitted, by means of electromagnetic coupling via a coil.

BACKGROUND ART

One method used for charging a built-in rechargeable battery in a piece of electrical equipment is a so-called noncontact power transmission method, in which electric power is transmitted from a battery charger by means of electromagnetic coupling (also referred to as dielectric coupling) by means of a coil. Further, there has been known a structure of a battery charger of this type in which power transmission is started after confirmation of whether or not a piece of electrical equipment (i.e. a load) appropriately placed on the battery charger is authorized equipment.

Documents concerning the background art of the present application include JP 2006-230032 A, JP 2006-60909 A, and JP 2689927 B.

There are cases in which a battery charger remains connected to a commercial power source even during a standby period in which a piece of electric equipment is not placed. In this case, the battery charger of noncontact power transmission type having a coil may suffer from malfunction of the operation when electromagnetic wave noise enters the battery charger via the coil. Further, malfunction of the operation is also likely to occur in the battery charger when a surge enters from the commercial power source due to lightning strike or the like. Here, although the example case of electric power transmission has been described above, similar circumstances can be identified in the case of transmission of a data signal by means of electromagnetic coupling via a coil.

The object of the present invention is to provide a noncontact transmission device for transmitting at least one of electric power and a data signal to a device to which at least one of the electric power and the data signal is to be transmitted, by means of electromagnetic coupling via a coil, which can operate in a stable manner even when disturbance such as electromagnetic waves and surges enters the noncontact transmission device.

DISCLOSURE OF THE INVENTION

In accordance with an aspect of the present invention, there is provided a noncontact transmission device which transmits at least one of electric power and a data signal to a device to which at least one of the electric power and the data signal is to be transmitted, by means of electromagnetic coupling via a coil, the noncontact transmission device including a monitoring clock oscillator which outputs a monitoring clock having a frequency lower than that of a system clock; a control circuit which operates by using the system clock and the monitoring clock; and a memory having stored therein information to be used by the control circuit, wherein the control circuit includes an internal storage circuit for storing the information read from the memory, and reads out the information from the memory and updates the information stored in the internal storage circuit with an update period which is based on the monitoring clock. Preferably, the control circuit is reset with a reset period which is longer than the update period and which is based on the monitoring clock, and each time reset is performed, reads out the information from the memory and updates the information stored in the internal storage circuit.

With the above structure, because the control circuit utilizes information which is updated periodically, there can be provided a noncontact transmission device which can be automatically restored from the influences of disturbance to operate stably.

BRIEF DESCRIPTION OF THE DRAWINGS

These and other objects of the invention will be explained below by reference to the accompanying drawings, in which.

BEST MODE FOR CARRYING OUT THE INVENTION

Figure 1:
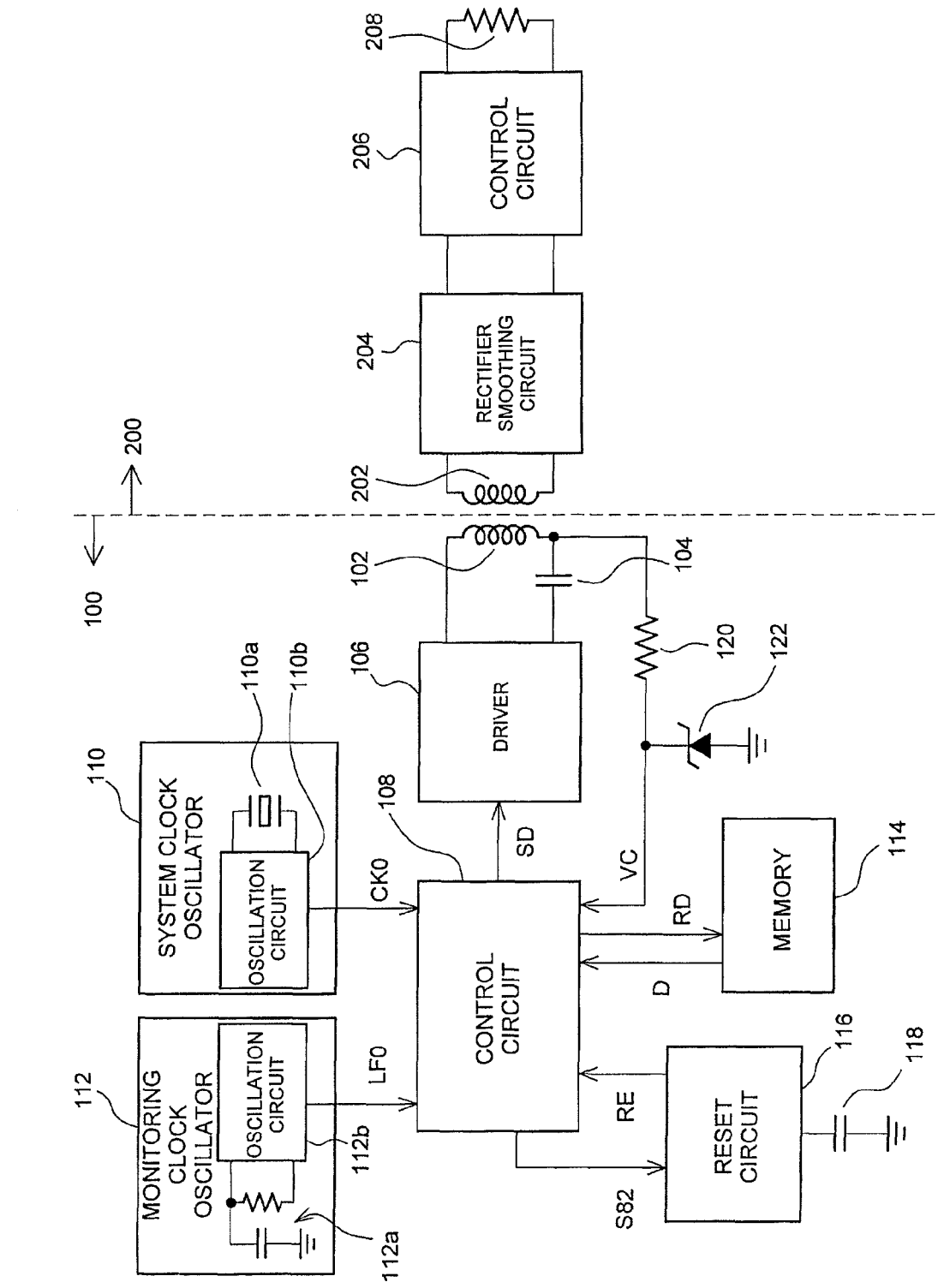
FIG. 1 is a block diagram for explaining an example transmission device according to an embodiment of the present invention.

FIG. 1 shows a block diagram for explaining an example of a transmission device 100 according to an embodiment of the present invention. The transmission device 100 transmits at least one of an electric power and a data signal to a device 200 to which at least one of electric power and a data signal is to be transmitted. For ease of explanation, FIG. 1 also shows an example of the device 200. Here, transmission of electric power and so on is achieved by a noncontact transmission method which is executed by electromagnetic induction in a state in which the transmission device 100 and the device 200 are electromagnetically coupled with each other. It should be noted that although in this embodiment the device 200 is any of a variety of types of electric equipment and the transmission device 100 is a battery charger for the various types of electric equipment, these devices 100 and 200 are not limited to these examples.

The transmission device 100 includes a coil 102, a capacitor 104, a driver 106, a control circuit 108, a system clock oscillator 110, a monitoring clock oscillator 112, a memory 114, a reset circuit 116, a capacitor 118, a resistor 120, and a Zener diode 122.

The coil 102 is electromagnetically coupled with a coil 202 of the device 200 to enable transmission of electric power and so on via the coils 102 and 202. Here, the coil 102, which can be configured by a planar air-core coil, may also be configured by other structures. One end of the coil 102 is connected with the driver 106 and the other end of the coil 102 is connected with the driver 106 via the capacitor 104. By means of the coil 102 and the capacitor 104, a voltage signal supplied from the driver 106 to the coil 102 is alternated (converted to alternating current) and boosted.

Figure 2:
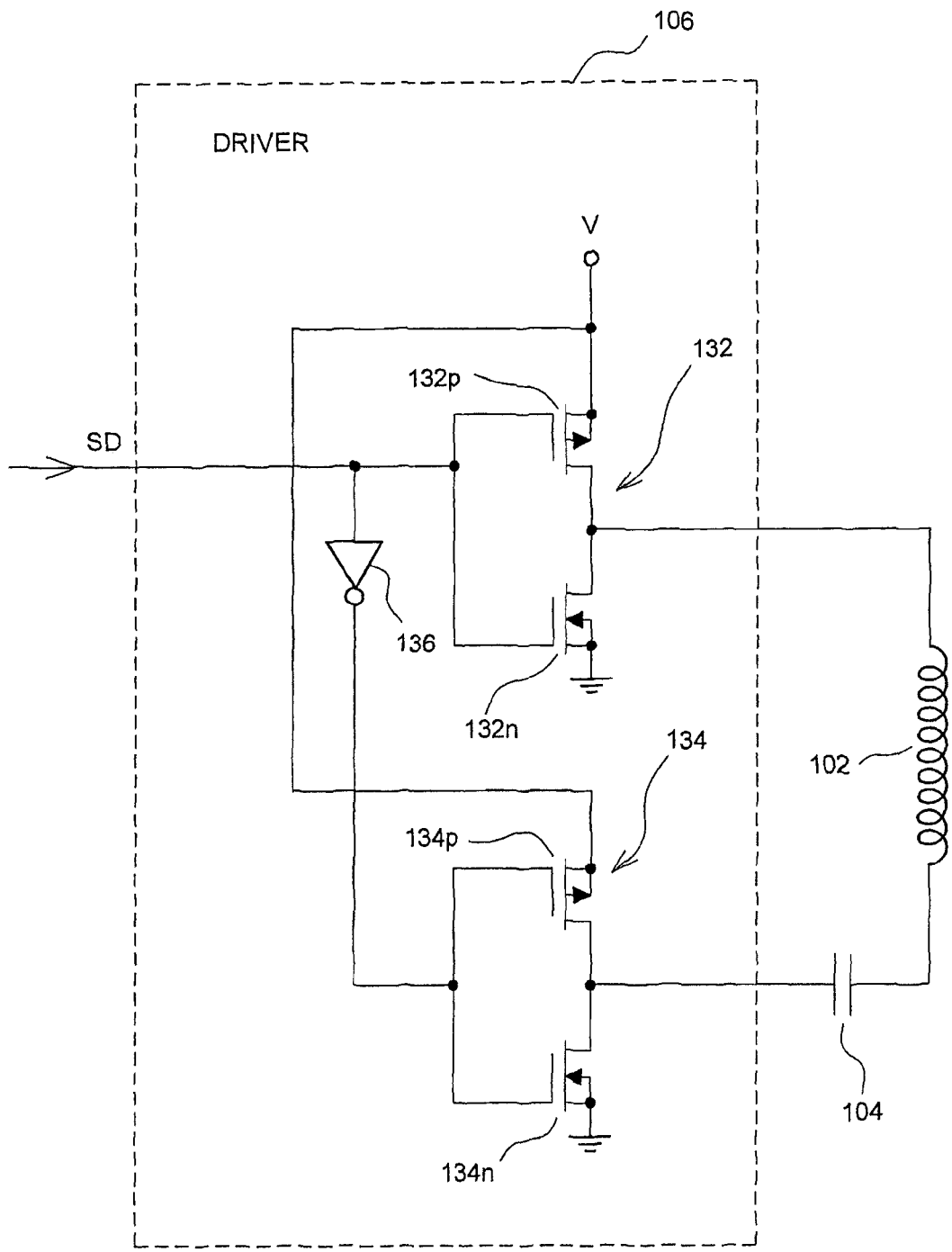
FIG. 2 is a circuit diagram for explaining an example driver of the transmission device according to the embodiment of the present invention.

The driver 106 is a circuit which supplies a voltage to the coil 102. In other words, the driver 106 is a circuit for driving the coil 102. FIG. 2 shows an example structure of the driver 106. It should be noted that, for ease of explanation, FIG. 2 also shows the coil 102 and the capacitor 104. In this example, the driver 106 is formed from a C-MOS (Complementary-Metal Oxide Semiconductor) circuit 132, a CMOS circuit 134, and an inverter 136.

The CMOS circuit 132 is formed by a P-channel MOSFET (Metal Oxide Semiconductor Field Effect Transistor) 132p and an N-channel MOSFET 132n which are connected in series with each other between a power source voltage V and a ground potential. A drain of the MOSFET 132p and a drain of the MOSFET 132n (which are connected with each other) are connected with one end of the coil 102. A driver control signal SD output from the control circuit 108 is commonly input to a gate of the MOSFET 132p and a gate of the MOSFET 132n. Here, the power source voltage V is generated by converting a commercial alternating current power source into a direct current power source by means of an unillustrated AC adaptor (AC-DC converter), for example. The AC-adaptor may be provided within the transmission device 100 or may be provided externally to the transmission device 100.

The CMOS circuit 134 is formed by a P-channel MOSFET 134p and an N-channel MOSFET 134n which are connected in series with each other between the power source voltage V and the ground potential. A drain of the MOSFET 134p and a drain of the MOSFET 134n (which are connected with each other) are connected with the other end of the coil 102 via the capacitor 104. The driver control signal SD output from the control circuit 108 is commonly input to a gate of the MOSFET 134p and a gate of the MOSFET 134n.

With the above structure, when the level of the driver control signal SD is H (High), the MOSFETs 132n and 134p are turned ON. In contrast, when the driver control signal SD is at an L (Low) level, the MOSFETs 132p and 134n are turned ON. When transmitting electric power from the transmission device 100 to the device 200 to which the electric power is to be transmitted, with the repetition of H level and L level of the driver control signal SD in an alternating manner, an alternating current voltage is applied to the coil 102. When transmitting various data signals from the transmission device 100 to the device 200 to which various data signals are to be transmitted, meanwhile, with the modulation of the pulse width or the period of H level and L level of the driver control signal SD, a voltage in accordance with the transmission data is applied to the coil 102.

The control circuit 108 includes a logic circuit which receives a system clock (also referred to as a master clock) supplied from the system clock oscillator 110 and a monitoring clock LF0 supplied from the monitoring clock oscillator 112 and uses these clocks CK0 and LF0 to operate. The control circuit 108 generates the driver control signal SD, which is then output to the driver 106, for example. The control circuit 108 will be described in further detail below.

The system clock oscillator 110 is formed by including, for example, a crystal oscillator 110a and an oscillation circuit 110b connected with the crystal oscillator 110a. Here, a ceramic oscillator and so on may be used in place of the crystal oscillator. The oscillation circuit 110b causes the crystal oscillator 110a to operate in a stable manner and transforms the output of the crystal oscillator 110a into a rectangular pulse, for example, and outputs the rectangular pulse as a system clock CK0. The frequency of the system clock CK0 is 32 MHz, for example. The system clock oscillator 110 is provided such that the system clock CK0 can be supplied to the control circuit 108.

The monitoring clock oscillator 112 generates and outputs a clock LF0 having a frequency of 250 kHz, for example, which is lower in frequency than the system clock CK0. The monitoring clock oscillator 112 is formed from, for example, an RC oscillation circuit 112a formed of a resistor and a capacitor and an oscillation circuit 112b connected to the RC oscillation circuit 112a. The oscillation circuit 112b causes the RC oscillation circuit 112a to operate in a stable manner and transforms the output of the RC oscillation circuit 112a into a rectangular pulse, for example, and outputs the rectangular pulse as a monitoring clock LF0. The monitoring clock oscillator 112 is provided such that the monitoring clock LF0 can be supplied to the control circuit 108.

The memory 114 is provided such that the control circuit 108 can access the memory 114, and is configured to send the predetermined information D which is stored in the memory 114 to the control circuit 108 in accordance with a read-out command RD from the control circuit 108, for example. The memory 114 is formed by a non-volatile memory such as a mask ROM (Read Only Memory) or EEPROM (Electronically Erasable and Programmable Read Only Memory). Examples of the information D stored in the memory 114 include the frequencies of the H level and L level of the driver control signal SD; i.e. the driving frequency of the coil 102.

The reset circuit 116 resets the control circuit 108 as a whole. Specifically, the control circuit 108, upon receiving a reset signal RE from the reset circuit 116, reboots itself. The reset circuit 116 is grounded via the capacitor 118.

The resistor 120 includes one end connected to the other end of the coil 102 and the other end grounded via the Zener diode 122 and connected to the control circuit 108. With this structure, a voltage (or an electric current) at the other end of the coil 102 is input, via the resistor 120, to the control circuit 108 as a voltage VC. Here, the resistor 120 and the Zener diode 122 protect the control circuit 108 from excessive input voltage.

The voltage VC is used by the control circuit 108 for detecting whether or not the transmission device 100 and the device 200 are placed in an electromagnetically coupled state. Such detection can be achieved by reference to variation in the relationship between the phase of the voltage VC and the phase of a predetermined reference clock (e.g. a clock obtained by dividing the system clock CK0 to a frequency of several kHz) between the state in which the device 200 is in an appropriate electromagnetically coupled state with the transmission device 100 (i.e. a normal load state) and other states. For example, the phase of the voltage VC is identical with the phase of the above-described reference clock in the normal load state, whereas the phase of the voltage VC is delayed with respect to the phase of the reference clock in a state in which the device 200 is not electromagnetically coupled with the transmission device 100 (i.e. a non-load state). Accordingly, whether or not the normal load state is established can be detected by comparing the phase of the voltage VC with the phase of the reference clock. Alternatively, the above detection can also be achieved by reference to the amplitude of the voltage VC, for example. For example, because, in the normal load state, resonance is generated via the coils 102 and 202 and the amplitude of the voltage VC is increased as compared to that in the non-load state, whether or not the normal load state is established can be detected by comparing the amplitude of the voltage VC with a predetermined reference voltage. Here, in a state in which a conductive object other than the device 200 is placed close to the coil 102 (i.e. a foreign material loaded state), both the phase and the amplitude of the voltage VC differ from those in the normal load state and the non-load state, thereby enabling detection of the foreign material loaded state. In addition, the normal load state can also be detected by reference to the ID data assigned to the device 200.

For example, information D concerning the reference value for comparison and ID for use in the above detection may be stored in the memory 114. In this case, the transmission device 100 can be configured such that the control circuit 108 obtains the information D at the time of actuating the transmission device 100.

The device 200 to which electric power and the like is to be transmitted is formed by including a coil 202 formed of a planar air-core coil, for example; a rectifier smoothing circuit 204; a control circuit 206 and a load 208. Here, the load 108 is a rechargeable battery, for example. The rectifier smoothing circuit 204 is a circuit which rectifies and smoothes electric power or the like transmitted from the coil 102 to the coil 202, and is formed from, for example, a diode bridge connected to both ends of the coil 202 and a capacitor connected in parallel to the output of the diode bridge. The load 208 is connected to the output of the diode bridge, for example. Here, for simplification of explanation, the control circuit 206 generally refers to a circuit which performs various control operations in the device 200. The control circuit 206 is configured to allow control of supply of the voltage to the coil 202, for example, and can transmit a data signal to the transmission device 100 via the coils 202 and 102 by modulating the voltage. The data signal transmitted to the transmission device 100 may include ID data or the like assigned to the device 200.

Figure 3:
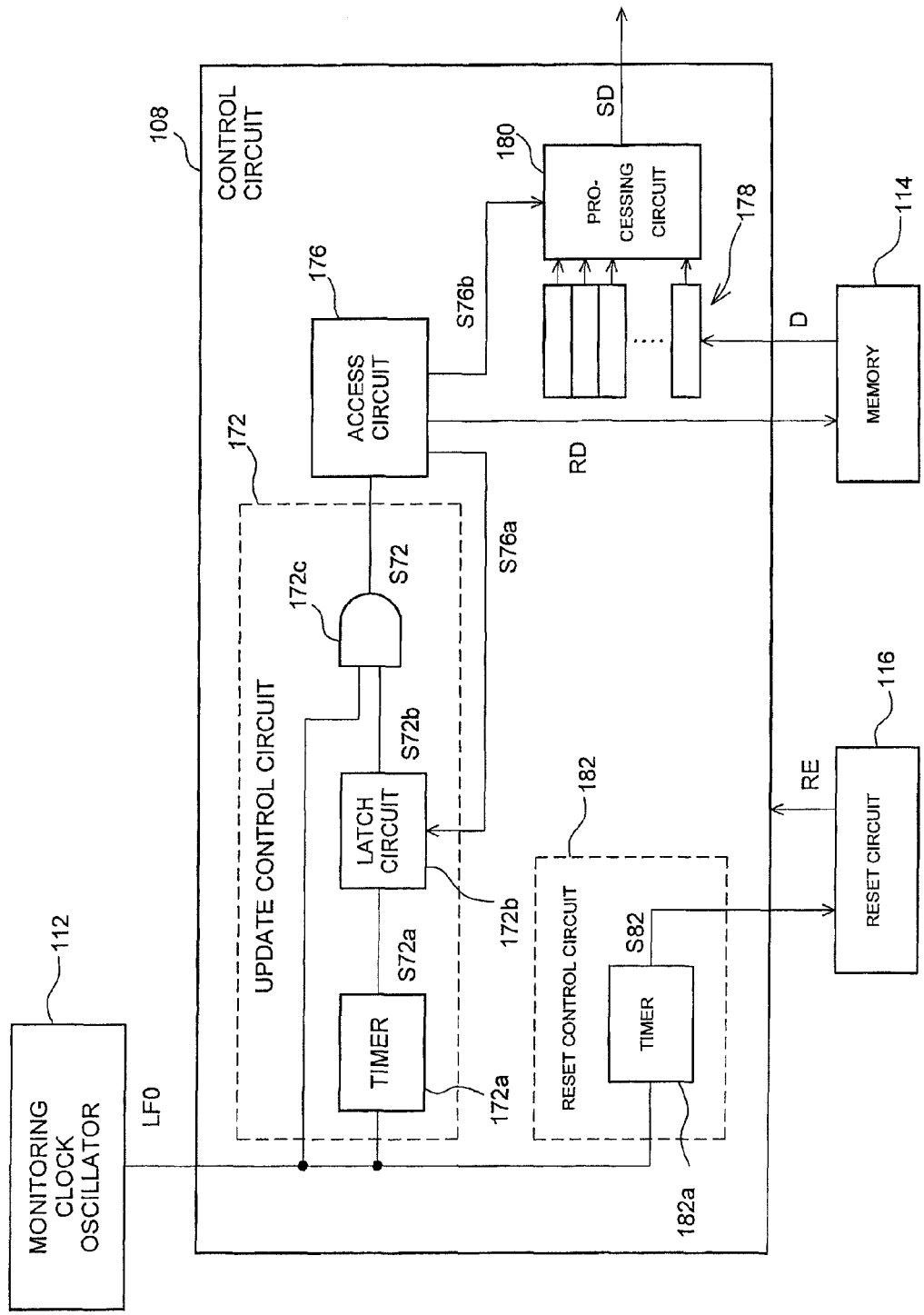
FIG. 3 is a block diagram for explaining an example control circuit of the transmission device according to the embodiment of the present invention.
Figure 4:
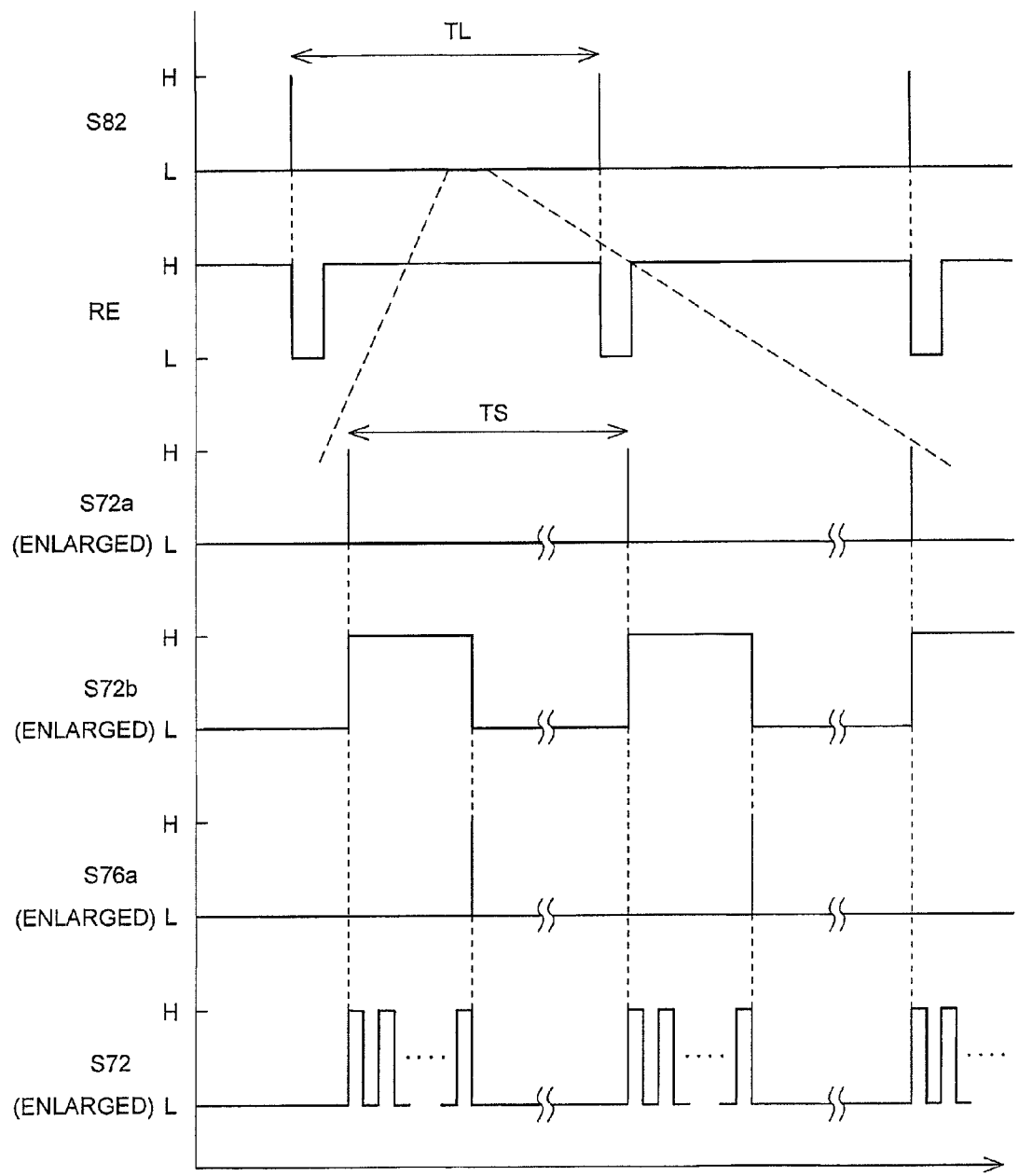
FIG. 4 is a timing chart for explaining an example operation of the transmission device according to the embodiment of the present invention.

FIG. 3 shows an example structure of the control circuit 108. Here, for the ease of explanation, FIG. 3 also shows the monitoring clock oscillator 112, the memory 114, and the reset circuit 116. Further, FIG. 4 shows a timing chart for explaining an example operation of the transmission device 100.

In the example shown in FIG. 3, the control circuit 108 includes an access circuit 176, an internal storage circuit 178, and a processing circuit 180.

The processing circuit 180 performs various types of processing in the control circuit 108 and includes a driver control signal generating circuit which generates a driver control signal SD and a detector which performs the above-described detection for detecting whether or not the device 200 is in an electromagnetically coupled state. The processing circuit 180 executes processing by using the various information D stored in the internal storage circuit 178. For example, the internal storage circuit 178 stores therein the information D concerning the driving frequency of the coil 102 which is used for generating the driver control signal SD, the reference value for comparison which is used for the detection described above, ID, and so on. The internal storage circuit 178 is formed of a volatile memory such as a latch circuit.

The access circuit 176 sends a readout command RD to the memory 114 such that the various types of information D are read out from the memory 114 and supplied to the internal storage circuit 178. In accordance with this readout command RD, the memory 114 outputs the information D to the internal storage circuit 178.

Here, the transmission device 100 is configured such that, in the initialization processing performed after power ON, the information D is transferred from the memory 114 to the internal storage circuit 178 by means of the access circuit 176. The transmission device 100 is further configured such that the transfer of the information D to the internal storage circuit 178 can be executed periodically. Such a configuration will be described below. In the example structure shown in FIG. 3, the control circuit 108 further includes an update control circuit 172 and a reset control circuit 182. Here, the above elements 172, 176, 178, 180, and 182 of the control circuit 108 can be formed by a logic circuit and the control circuit 108 can be formed as a logic IC (Integrated Circuit).

The update control circuit 172 is formed from a timer 172a, a latch circuit 172b, and an AND circuit (logical multiplication circuit) 172c.

The timer 172a receives the monitoring clock LF0 supplied thereto, and uses the monitoring clock LF0 to generate a timer signal S72a. In this example, the time signal S72a has a waveform which intermittently changes (transits) to the H level (see FIG. 4), and the period TS of the H level of the timer signal 72a is 1 minute, for example.

The latch circuit 172b, upon receiving the timer signal S72a, causes the output signal S72b to transit to H level in synchronization with the transition of the timer signal S72a to H level, and retains the output signal S72b at H level until receipt of a readout completion signal S76a, which will be described below (see FIG. 4).

The AND circuit 172c uses, as input signals, the output signal S72b of the latch circuit 172b and the monitoring clock LF0. Consequently, the clock LF0 is output from the AND circuit 172c only during the period in which the output signal S72b of the latch circuit 172b is at H level. The output of the AND circuit 172c is output as an update control signal S72 to the access circuit 176.

In accordance with the update control signal S72, the access circuit 176 sends the readout command RD to the memory 114, which then transfers the information D to the internal storage circuit 178. Thus, the information D within the internal storage circuit 178 is updated. The access circuit 176 then outputs the readout completion signal S76a to the latch circuit 172b in response to the completion of reading the information D. For example, when the number of information D items to be read out from the memory 114 is predetermined, the access circuit 176 outputs the readout completion signal S76a after sending the readout commands in the predetermined number.

The access circuit 176 also sends the readout completion signal S76b to the processing circuit 180 in response to the completion of reading the information D. Thus, the processing circuit 180, recognizing that the information D within the internal storage circuit 178 has been updated, can execute the processing by reference to the updated information D. Although in the above example the readout completion signal S76b to be transmitted to the processing circuit 180 and the readout completion signal S76a for the update control circuit 172 are separate signals, these signals S76a and S76b may be identical signals.

The reset control circuit 182 is a circuit which generates a reset control signal S82 and is formed from a timer 182a, for example. The timer 182a receives the monitoring clock LF0 supplied thereto and uses the monitoring clock LF0 to generate a timer signal, which is then output as the reset control signal S82. In this example, the reset control signal S82 has a waveform which intermittently transits to H level (see FIG. 4). The period TL of the reset control signal S82 is longer than the period TS of the update control signal S72 described above, and is 2 hours, for example. The reset control signal S82 is output to the reset circuit 116.

The reset circuit 116, upon receiving the reset control signal S82 at H level, resets and reboots the control circuit 108 by means of a reset signal RE. Here, FIG. 4 shows an example in which the reset signal RE has a rectangular waveform which transits to L level in synchronization with the transition of the reset control signal S82 to H level and remains the L level for a predetermined time width. By the reboot operation described above, the control circuit 108 executes the initialization processing in a manner similar to that when power is ON. This initialization processing includes transfer of the information D from the memory 114 to the internal storage circuit 178. As such, the information D within the internal storage circuit 178 is updated each time the reset operation is performed.

With the above structure, the information D within the internal storage circuit 178 is periodically updated by reading out the information D from the memory 114, with the update period TS and the reset period TL being based on the monitoring clock LF0. Consequently, even when disturbances such as electromagnetic waves and surges enter the transmission device 100 to change the information D stored within the internal storage circuit 178, the transmission device 100 can be automatically restored so that a stable operation can be achieved.

Here, in a case where a ROM is provided in the control circuit 108 in place of the internal storage circuit 178 to store the information D supplied from the memory 114, the information D is less likely to be changed even by the disturbance described above. In this case, however, as the information D varies among specifications of each transmission device, it is necessary to prepare a specific control circuit corresponding to each specification. With the transmission device 100 according to the present embodiment, on the other hand, as the memory 114 is externally provided to the control circuit 108, the memory 114 which stores predetermined information D and the control circuit 108 which is applicable to the various memories 114 can be used in combination, in accordance with the specifications of the transmission device 100.

As described above, the transmission device 100 has a structure featuring high versatility and anti-disturbance measures.

Further, as it is not necessary to make the monitoring clock LF0 synchronized with the system clock CK0, only a few restrictions result from the consistency of the whole system. Consequently, the monitoring clock oscillator 112 and the timers 172a and 182a may have a lower operation precision, such as oscillation precision, as compared to the system clock oscillator 110 and the like, so that the transmission device 100 can be easily achieved.

Also, as the monitoring clock oscillator 112 is commonly used by the timers 172a and 182a, an increase in the circuit scale can be suppressed.

Here, the output signals S72a and S82 from the timers 172a and 182a, respectively, may be in synchronization with each other or may be out of synchronization with each other.

Further, with the use of the result of detection of the device 200 described above, the information D stored in the internal storage circuit 178 may be updated only during the period in which the device 200 is not placed (i.e., a standby period), for example. In this case, as the updated ID or the like can be used for the above detection, it is possible to prevent an error in the detection, so that appropriate transmission of electric power or the like can be performed.

Also, the information D stored in the memory 114 is not limited to the above examples. For example, the transmission device 100 may be configured to store the information D concerning the periods TS and TL described above in the memory 114 and then read out and supply the information D to the internal storage circuit 178.

In addition, different types of information D stored in the internal storage circuit 178 may be updated between the periods TS and TL. For example, it is possible to update all the types of information D with the reset control signal, as opposed to updating only a part of the information D with the update control signal S72.

The waveforms of the various signals are not limited to those described above or those shown in FIG. 4. For example, the transmission device 100 may be configured to employ a waveform having H and L levels inverted with respect to the above example or waveforms other than rectangular waveforms. Further, although FIG. 4 shows the signals S82 and S72a in the form of impulses, they may be rectangular waveforms having a finite width. Also, the transition of the reset signal RE to L level may be in synchronization with either the rise or fall of the reset control signal S82. This is similarly applicable to signals having other waveforms.

INDUSTRIAL APPLICABILITY

The present invention can be used in a noncontact transmission device which transmits at least one of electric power and a data signal to a device to which at least one of the electric power and the data signal is to be transmitted by means of electromagnetic coupling via a coil.

The invention claimed is:

1. A noncontact transmission device which transmits at least one of electric power and a data signal to a device to which at least one of the electric power and the data signal is to be transmitted by means of electromagnetic coupling via a coil, the noncontact transmission device comprising:
    a monitoring clock oscillator which outputs a monitoring clock having a frequency lower than a frequency of a system clock;
    a memory having stored therein information for performing said transmission;
    a control circuit including an internal storage circuit for storing the information read by and transmitted from the memory, and an access circuit for periodically repeatedly transmitting a read command to said memory at a predetermined updating interval based on said monitoring clock for updating said information stored in said internal storage circuit.

2. The noncontact transmission device according to claim 1, wherein
    the access circuit periodically repeatedly reboots said control circuit at every re-set time occurring at a re-set interval set longer than said updating interval based on said monitoring clock, and also periodically repeatedly transmits said read command to said memory.

* * * * *